United States Patent [19]
Johns

[11] Patent Number: 5,244,335
[45] Date of Patent: Sep. 14, 1993

[54] TELESCOPIC TAILGATE RAMP

[76] Inventor: Jerry L. Johns, 4811 Oak Dr., Gainesville, Ga. 30506

[21] Appl. No.: 827,284

[22] Filed: Jan. 29, 1992

[51] Int. Cl.$^5$ .............................................. B65G 67/02
[52] U.S. Cl. ..................................... 414/537; 296/61; 403/109; 403/331
[58] Field of Search ................. 414/522, 537; 296/61; 14/71.1; 403/331, 109

[56] References Cited

U.S. PATENT DOCUMENTS

| | | | |
|---|---|---|---|
| 3,571,836 | 3/1971 | Dunlap | 14/71.1 |
| 3,642,156 | 2/1972 | Stenson | 414/537 |
| 3,977,545 | 8/1976 | Lloyd | 414/537 |
| 4,081,091 | 3/1978 | Thorley | 414/545 |
| 4,114,944 | 9/1978 | Joynt et al. | 414/537 X |
| 4,455,119 | 6/1984 | Smith | 414/537 |
| 4,571,144 | 2/1986 | Guidry et al. | 414/537 |
| 4,601,632 | 7/1986 | Agee | 414/537 |
| 4,624,619 | 11/1986 | Uher | 414/537 |
| 4,628,561 | 12/1986 | Kushniryk | 414/537 X |
| 4,845,792 | 7/1989 | Bakula et al. | 14/71.1 X |
| 4,864,673 | 9/1989 | Adaway et al. | 414/537 X |
| 4,900,217 | 2/1990 | Nelson | 414/537 |
| 4,923,360 | 5/1990 | Beauchemin | 414/537 |
| 5,137,114 | 8/1992 | Yde et al. | 14/71.1 X |

Primary Examiner—David A. Bucci
Attorney, Agent, or Firm—Michael V. Drew

[57] ABSTRACT

A telescopic tailgate ramp (10) has a base tray (20) and a series of telescopically-connected trays (40, 60, 80) that are slidable with respect to one another and are stackable to replace a tailgate of a vehicle. Each tray (20, 40, 60, 80) is a plate with end pieces on each side that engage the end pieces of a preceding or succeeding tray. The end pieces have a channel and a tenon-like portion that engage a corresponding tenon or channel portion of a preceding or succeeding tray. Each plate has a corrugated surface (102) for enhancing traction. The trays (20, 40, 60, 80) are prevented from being fully withdrawn from one another due to the placement of pins in corresponding channels and tenons that engage each other. The trays (40, 60, 80) succeeding the base tray are prevented from sliding past the rear portion of a preceding tray or the rear portion of the base tray (20) securing an obstruction over the rear portion of each channel. The base tray (20) holds the other trays and is pivotable within the tailgate frame (12) of a vehicle (11) upon which it is mounted. The base tray (20) is also pivotable about an axis through points on support bars (104, 110) that are attached to the base tray (20). Handles (100) facilitate movement and manipulation of the ramp (10) in general and the individual tray sections (20, 40, 60, 80).

20 Claims, 6 Drawing Sheets

Fig_5

TELESCOPIC TAILGATE RAMP

TECHNICAL FIELD OF THE INVENTION

The present invention relates to a portable ramp attachable to a truck or similar vehicle, and more particularly to a portable ramp which has telescopic sections and which is storable and transportable as the tailgate of the truck or similar vehicle.

BACKGROUND OF THE INVENTION

In the use of trucks and similar vehicles it is often desirable to move heavy or awkward loads into the cargo area of the vehicle. This is a problem when the cargo bed is at a different elevation than the surface upon which the load rests. A ramp is a means of alleviating the difference in height and providing an incline upon which the load may be rolled, slid or otherwise moved. In the use of many vehicles, particularly a smaller vehicle such as a pickup truck, it is normally not convenient to transport a ramp for use. Thus, it would be desirable to have a convenient means for transporting a ramp for use with a vehicle such as a truck or pickup truck.

When using vehicles which have a tailgate that can be lowered, it is often desirable to transport objects that extend beyond the normal tailgate length and which cannot be adequately supported because they extend beyond the lowered tailgate. Thus, it would be useful to have a means for supporting loads which extend beyond the normal tailgate of a truck or similar vehicle.

SUMMARY OF THE INVENTION

It is an object of the invention to provide a ramp for use with a truck, pickup truck or similar vehicle which is convenient to use, store and transport.

It is a further object of the invention to provide a portable ramp which may be stored and transported as a replacement for the tailgate of a truck, pickup truck or similar vehicle.

It is an additional object of the invention to provide a portable ramp as described above which may also be used as an extension for the bed of the truck, pickup truck or similar vehicle.

In the present invention, a base tray and a series of telescopically-connected trays that are slidable with respect to one another are stackable to replace a tailgate of a vehicle. Each tray is a plate with end pieces on each side that engage the end pieces of a preceding or succeeding tray. The end pieces have a channel and a tenon-like portion that engage a corresponding tenon or channel portion of a preceding or succeeding tray. Each plate has a corrugated surface for enhancing traction. The trays are prevented from being fully withdrawn from one another due to the placement of pins in corresponding channels and tenons that engage each other. The trays succeeding the base tray are prevented from sliding past the rear portion of a preceding tray or the rear portion of the base tray by an obstruction secured over the rear portion of each channel. The base tray, which holds the other trays, is pivotable within the tailgate frame of a vehicle upon which it is mounted. The base tray is also pivotable about an axis through points on support bars that are attached to the base tray. Handles facilitate movement and manipulation of the ramp in general and the individual tray sections.

Other aspects, objects, features, and advantages of the present invention will become apparent to those skilled in the art upon reading the detailed description of preferred embodiments.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawings. In the drawings, the same numerals are used for like features.

Figure 1:
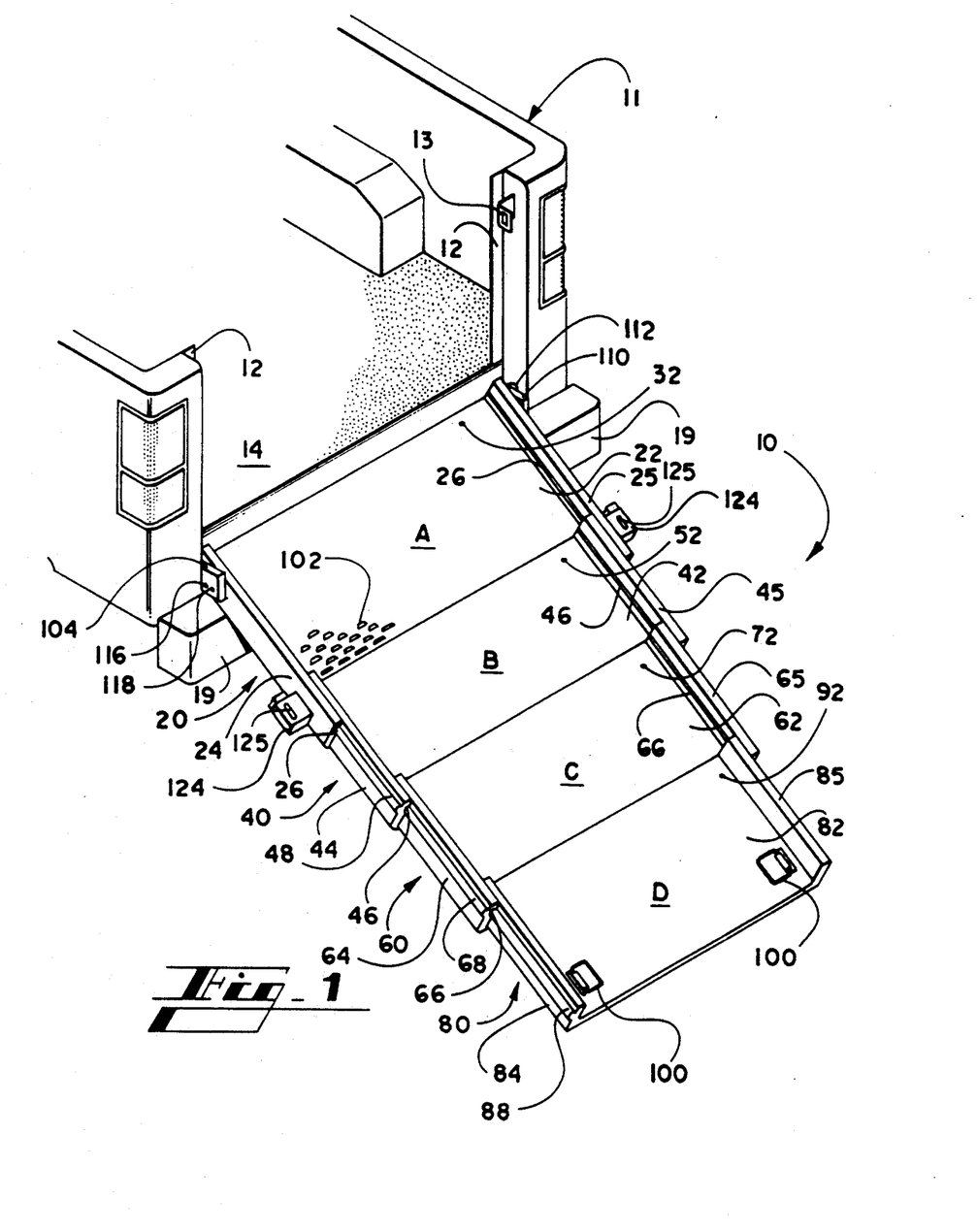
FIG. 1 is an isometric illustration of a telescopic tailgate ramp according to the present invention, mounted upon a pickup truck, with the ramp extended.

In a preferred embodiment of the invention, a series of telescopic ramp trays is mounted like a tailgate for a pickup truck or similar vehicle to provide a convenient ramp and vehicle-bed extension. Referring first to FIG. 1, therein is illustrated a telescopic tailgate ramp 10 according to a preferred embodiment of the present invention. The ramp 10 is shown extended from the tailgate frame 12 of a pickup truck 11. A slotted bracket 13 which serves as the catch for a lock of the removed tailgate can be seen. As will be explained below, this catch is also used in the locking mechanism for the telescopic tailgate ramp 10. The invention is designed to replace the standard tailgate of a pickup truck or similar vehicle which has a tailgate frame. The ramp 10 is made up of a series of telescoping trays. Although a varying number of trays may be used, the preferred embodiment illustrated has four. For quick reference and clarity the four trays 20, 40, 60, 80 are designated respectively as A, B, C and D. A plate and telescopic end pieces form each tray. Each end piece is an elongated member designed to cooperate in a telescopic manner with an end piece of a preceding wider tray and a successive narrower tray. The telescopic cooperation is achieved by what may be described as a mortise and tenon arrangement. In this arrangement, there is matching of an elongated channel, or mortise-like portion, of an end piece of one tray with an elongated tenon-like portion of another tray. This structure will be explained in greater detail below. To allow for the telescopic movement desired, each tray 20, 40, 60, 80 is successively narrower than the preceding tray. The tray 20 designated A is the widest tray and may be considered the base tray. This base tray 20 has a plate 22 and telescopic end pieces 24, 25. Each telescopic end piece 24, 25 has a channel for receiving the next, narrower ramp tray 40 which is designated as tray B. The tray 40 designated as tray B has a plate 42 to which telescopic end pieces 44, 45 are connected. Each telescopic end piece 44, 45 has a channel 46 for receiving the next, narrower ramp tray 60. Each telescopic end piece 44, 45 also has an elongated tenon-like portion 48 which fits into and is slidable within each respective channel 26 of the telescopic end pieces 24, 25 of the ramp tray 20 designated as tray A. The tray 60 designated as tray C has a plate 62 to which telescopic end pieces 64, 65 are connected. Each telescopic end piece 64, 65 has a channel 66 for receiving the next, narrower ramp tray 80. Each telescopic end piece 64, 66 also has an elongated tenon-like portion 68 which fits into and is slidable within each respective channel 46 of the telescopic end pieces 44, 45 of the ramp tray 40 designated as tray B. The tray 80 designated as tray D has a plate 82 to which telescopic end pieces 84, 85 are connected. This tray 80 is the last tray in succession and, therefore, its telescopic end pieces 84, 85 do not need channels to accommodate a succeeding tray. Each telescopic end piece 84, 85 has an elongated tenon-like portion 88 which fits into and is slidable within each respective channel 66 of the telescopic end pieces 64, 65 of the ramp tray 60 designated as tray C. The telescopic end pieces 24, 25, 44, 45, 64, 65, 84, 85 also serve as rails to help prevent items or individuals from slipping off of the sides of the ramp 10, particularly when the ramp 10 is extended and lowered as shown in FIG. 1.

The plate 22, 42, 62, 82 of each respective ramp tray 20, 40, 60, 80 contains a hole 32, 52, 72, 92 which receives a pin for two purposes. One purpose is to keep the trays 20, 40, 60, 80 from sliding with respect to one another when the ramp 10 is fully retracted. The second purpose is to keep the trays 20, 40, 60, 80 from sliding with respect to one another when the ramp 10 is extended. These details will be explained further, below. The ramp 10, and, in particular, its essential ramp trays 20, 40, 60, 80, may be made of any material from which the structural elements described herein may be manufactured. In general, a metal material would provide the strength necessary for use of the ramp 10. Many metal materials, such as steel, although providing strength are materials which would result in an extremely heavy ramp 10. It is important that the ramp not be made too heavy to maneuver and manipulate. The use of nonmetal, light-weight materials such as high-density plastics would reduce the overall weight of the ramp but may not provide a ramp sturdy enough for all purposes. Aluminum is a suitable material from which to construct the ramp because it provides the strength of a metal but is not as heavy as other metals. To enhance traction for walking on the ramp 10, the plates 22, 42, 62, 82 have corrugation-like protrusions 102. The protrusions 102 may be created by a variety of structural elements, such as ridges, blisters or even furrows. A suitable corrugated-like protrusion 102 surface may be provided by making the plates 22, 42, 62, 82 from diamond tread plate. To also help make the ramp 10 lightweight while remaining sturdy, aluminum diamond tread plate in particular may be used.

Handles 100 provide a convenient means for lifting and lowering the ramp 10 in either an extended or retracted position. The handles 100 also aid in extending and retracting the ramp 10. The handles 100 are spring-loaded to cause them to remain flat until lifted for use. In using the ramp 10, the handles 100 are less obtrusive when lying flat.

The ramp 10 is designed to utilize the tailgate frame 12 of the pickup truck 11. The ramp 10 is attached to the tailgate frame 12 of the truck 11 in a manner that allows the ramp 10 to pivot with respect to the vehicle within the tailgate frame 12. Any mechanism, such as a hinge, which allows the ramp 10 to pivot while also providing strength may be employed. However, the invention utilizes standard tailgate-mounting hardware found on most trucks 11 to create a pivoting mechanism as described immediately and in more detail below. Support bars 104, 110 are respectively attached to each telescopic end piece 24, 25 of the first and widest ramp tray 20, which is designated as tray A. Each support bar 104, 110 has a pivot cylinder which engages the tailgate frame 12 of the truck 11. One of the pivot cylinders 112 can be seen in FIG. 1. The support bars 104, 110 and pivot cylinders will be discussed further below. In addition to being pivotable with respect to the tailgate frame 12, the set of ramp trays 20, 40, 60, 80 is also pivotable with respect to the support bars 104, 110. Pivoting of the set of trays 20, 40, 60, 80 with respect to the support bars 104, 110 is about an axis through a point 116 on the respective support bars 104, 110. A simple, suitable pivot point is a pin 116 through each support bar 104, 110 and a respective telescopic member 24, 25. One pivot pin 116 can be seen in FIG. 1. The ramp 10 is made pivotable about the pin 116 so that the bumper 19 of the truck 11 will not impede the downward rotation of the ramp 10. As can be seen in FIG. 1, the pivot pin 116 is located in the support bar 104 at a point which provides the necessary clearance between the bumper 19 and the ramp 10. The axis of pivot of the ramp trays 20, 40, 60, 80 with respect to the support bars 104, 110 is through a pin which is farther away from the tailgate frame 12 of the truck 11 than the axis of pivot of the ramp trays 20, 40, 60, 80 with respect to the tailgate frame 12. In using the invention, it is not always desirable to pivot the set of ramp trays 20, 40, 60, 80 with respect to the support bars 104, 110 about the pins 116. For example, when the retracted ramp 10 is being raised or lowered, or when the extended ramp 10 serves as an extension of the bed of the truck. The set of ramp trays 20, 40, 60, 80 can be made temporarily nonpivotable with respect to the support bars 104, 110 by any means which prevents rotation of the set of trays 20, 40, 60, 80 with respect to the support bars 104, 110. A simple means to prevent rotation is to insert a pin, an anti-pivot pin 118, through each support bar 104, 110 and into each parallelly-aligned telescopic end piece 24, 25, respectively. The trays 20, 40, 60, 80 are made pivotable by withdrawal of each anti-pivot pin 118 from its respective telescopic end piece 24, 25. The anti-pivot pin 118 is of the type having a spring-loaded ball bearing. Because the anti-pivot pin 104 is spring-loaded it may be withdrawn only from the telescopic end piece 24, 25 but left in place in the support bar 104, 110 for re-engagement. The end of one anti-pivot pin 118 can be seen projecting from one support member 104 in FIG. 1. The set of trays 20, 40, 60, 80 is shown pivoted downward with respect to the support bars 104, 110. In this view, the anti pivot pin 118 has been disengaged from each telescopic end piece 24, 25 of the base tray 20. The telescopic end pieces 24, 25 are free to rotate with respect to the support bars 104, 110 and are shown in non-parallel alignment.

Figures 2, 8:
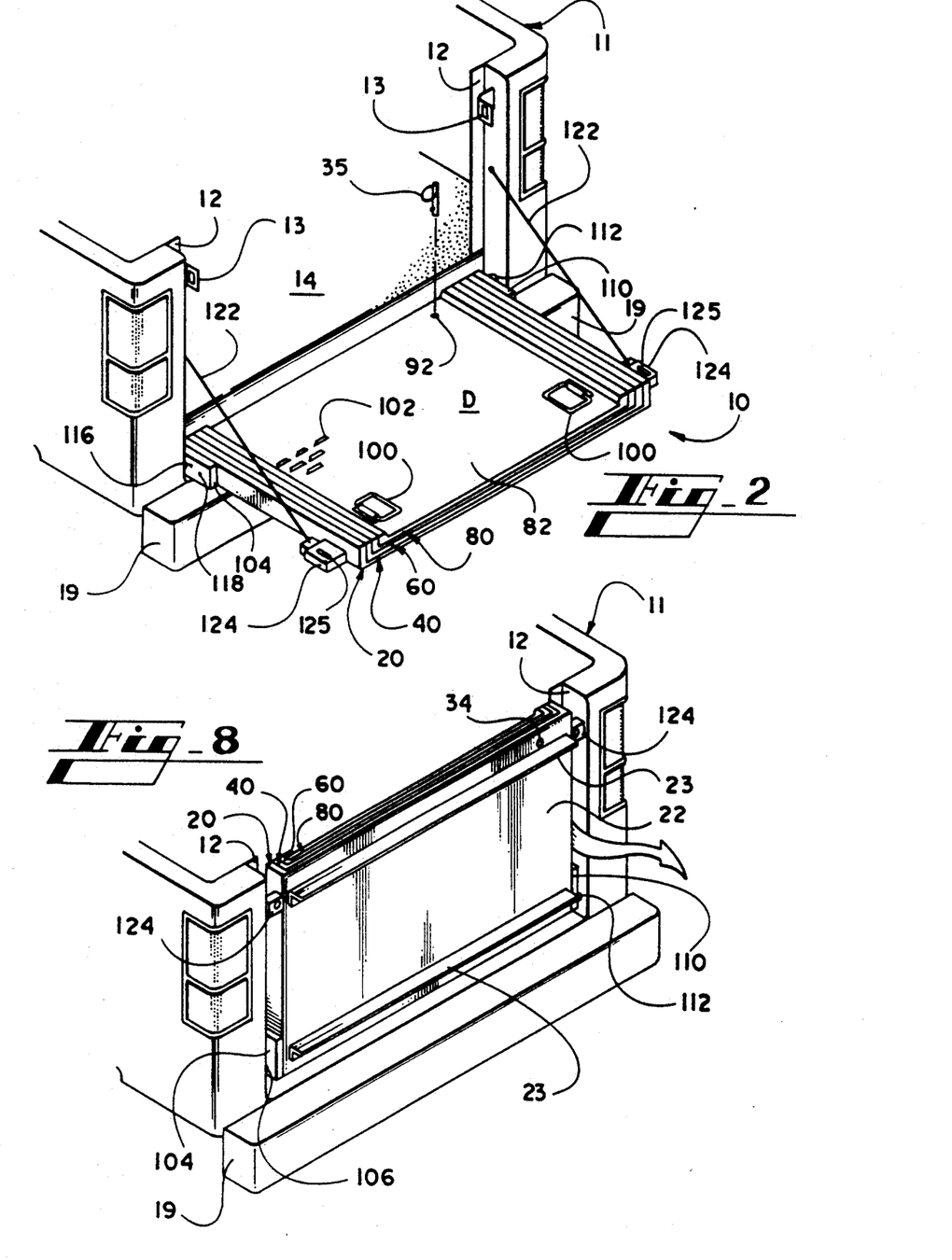
FIG. 2 illustrates the ramp of FIG. 1 retracted.
FIG. 8 illustrates the ramp of FIG. 1 retracted and raised.

Referring now to FIG. 2, therein is illustrated the retracted telescopic tailgate ramp 10 in a lowered, horizontal position. In this illustration, the trays 20, 40, 60, 80 have been pushed within one another to a fully retracted, stacked alignment. When the trays 20, 40, 60, 80 are fully retracted the ramp 10 has the configuration of a tailgate and functions in the same manner. To ensure a horizontal alignment of the retracted ramp 10, with the bed 14 of the truck 11, the telescopic end pieces 24, 25 of the bottom-most, and widest, tray 20 are placed in parallel alignment with respective support bars 104, 110 and the anti-pivot pins 118 are pushed through the support bars 104, 110 into the telescopic end pieces 24, 25 of the lower most, or base, tray 20. In FIG. 2, the support bars 104, 110 and telescopic end pieces 24, 25 of the bottom-most, and widest, tray 20, that is, the base tray, are shown in parallel alignment. The tailgates of most trucks and similar vehicles lie level with the bed of the truck or similar vehicle when the tailgate is lowered. Since the invention's telescopic tailgate ramp 10 replaces a removed standard tailgate and functions in the space normally occupied by the removed standard tailgate, the telescopic tailgate ramp 10 also lies essentially parallel to and level with the bed of the truck 11 or similar vehicle when in a lowered position, as shown in FIG. 2. As discussed above, the preferred embodiment of the telescopic tailgate ramp 10 attaches to and pivots within the tailgate frame 12 of a truck 11 or similar vehicle. A standard tailgate is normally held level with the bed of a vehicle by means of a cable, chain or bar extending from the tailgate frame of the vehicle down to the standard tailgate, suspending the standard tailgate from the tailgate frame. As shown in FIG. 2., the retracted ramp 10 is suspended in parallel, level alignment with the bed 14 of the pickup truck 11 by cables 122 extending from the tailgate frame 12 of the truck 11 to the lock housing 124 of the ramp 10. Each cable 122 is connected to the lock housing 124 by any suitable fastening means such as bolting directly to the housing or looping through the eyelet of a hook attached to the housing 124. Although the cables 122 are shown connected to the lock housings 124 of the ramp, the cables 122 may be connected directly to the telescopic end pieces 24, 25 of the base tray 24 at any suitable position which provides adequate support for the ramp 10. As in the case of a standard tailgate, chains or bars, rather than cables, may also be used as the means of suspension. When the trays 20, 40, 60, 80 are in the retracted, stacked position, it is important that they do not slide with respect to one another until desired. To prevent sliding, an anti-sliding securement pin 35 is inserted through a hole in the plate 82 of the topmost tray 80. When the trays 20, 40, 60, 80 are retracted, the holes 32, 52, 72, 92 in the respective trays 20, 40, 60, 80, shown in FIG. 1., are in alignment over one another. The alignment of holes 32, 52, 72, 92 allows the anti-sliding securement pin 35 to be inserted through all of the plates 22, 42, 62, 82, preventing the trays 20, 40, 60, 80 from sliding with respect to one another. When the telescopic tailgate ramp 10 is suspended in the parallel position shown in FIG. 2., it may serve as an extension for the truck bed 14. As a truck-bed extension, the ramp 10 may be used in the fully retracted position shown providing a bed 14 extension the length of the retracted ramp 10, or a longer bed 14 extension can be provided by partially or completely pulling out the trays 40, 60, 80 resting on the base tray 20.

Figure 3:
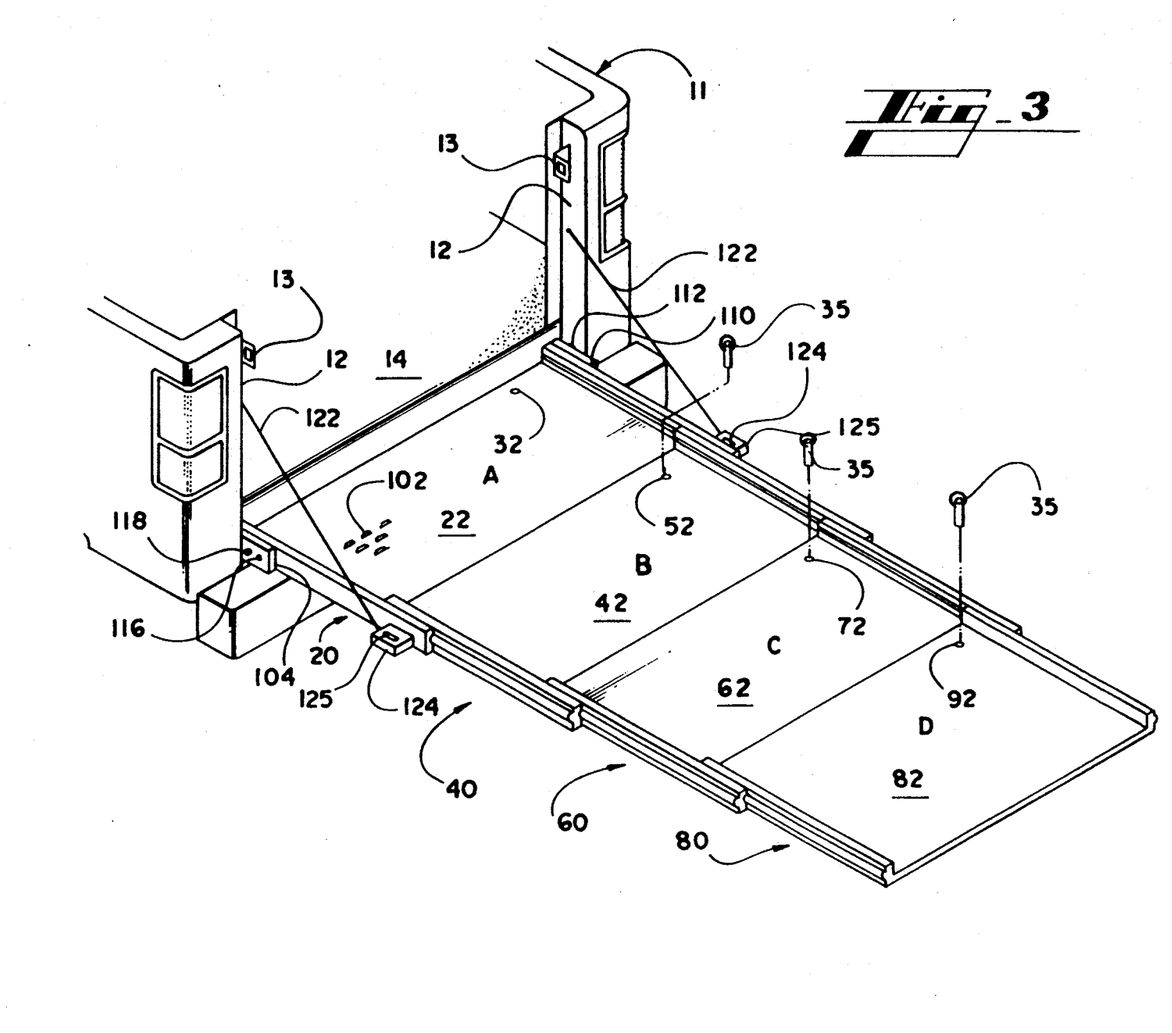
FIG. 3 illustrates the ramp of FIG. 1 in a position essentially parallel to the bed of the truck, used as an extension of the truck bed.

Referring now to FIG. 3, the telescopic tailgate ramp 10 is shown fully extended, in parallel relationship to the bed 14 of the truck 11. In this position, the ramp 10 serves as a maximum extension of the bed 14 of the truck 11. Features of the invention which have been previously discussed are shown. In addition, FIG. 3 illustrates the use of multiple anti-sliding securement pins 35 placed through holes 52, 72, and 92 to prevent the trays 40, 60, 80 from sliding with respect to one another and with respect to the base tray 20. The holes 52, 72, 92 in the respective trays 40, 60, 80, through which the pins 35 are inserted, are aligned over corresponding holes in respective preceding trays 20, 40, 60. These corresponding holes are not perceivable in the view of FIG. 3.

Figures 4, 7, 14:
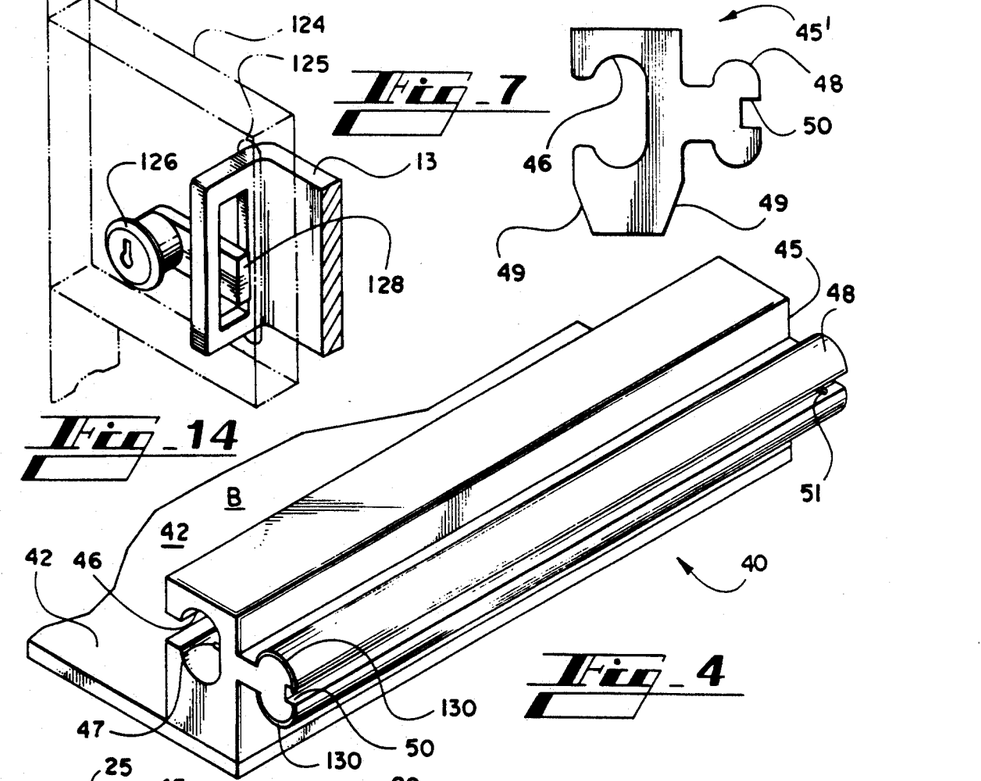
FIG. 4 is an isometric illustration of a portion of one of the ramp trays of the invention of FIG. 1.
FIG. 7 is a front view of an alternative embodiment of one of the telescopic members of the invention of FIG. 1.
FIG. 14 is an isometric illustration of a locking mechanism of the invention of FIG. 1.

Referring now to FIG. 4, greater detail of the structure of one of the trays is shown. An end portion of one middle tray 40 is shown illustrating the detail of the connection of the tray's 40 plate 42 to a telescopic end piece 45. In this detailed illustration, the channel 46 and elongated tenon 48 are shown. To prevent metal to metal contact and reduce friction between a channel of a telescopic end piece and the elongated tenon of a succeeding tray, a friction-reducing material is placed between the channel and tenon. In FIG. 4, a plastic coating 130 is placed on the elongated tenon 48. A suitable plastic coating 130 and method of affixing is a self-adhesive plastic strip.

FIG. 4 also illustrates the structure of the ramp which prevents the trays 40, 60, 80 from being fully withdrawn from one another. Full withdrawal of a tray is prevented by the engagement of a pin which is located in the channel of a telescopic end piece with a pin which is located in the groove of an elongated tenon which is received by the channel. In the preferred embodiment illustrated, a pin, for convenience called a stopping pin, is placed in the channel of each telescopic end piece near the end farthest from the truck 11. A pin is placed in the groove of each elongated tenon of a telescopic end piece near the end closest to the truck 11. FIG. 4 shows the stopping pin 47 embedded in the channel 46 and stopping pin 51 embedded in the groove 50 of the elongated tenon 48 of telescopic end piece 45. Referring now also momentarily to FIG. 1, the stopping pin 47 in channel 46 of the telescopic end piece 45 of tray 40 is intended to engage a stopping pin in the groove of the elongated tenon 68 of telescopic end piece 65 of the succeeding tray 60. The stopping pin 51 in the groove 50 of the elongated tenon 48 of telescopic end piece 45 is intended to engage the stopping pin in the channel of telescopic end piece 25 of preceding tray 20.

Figure 5:
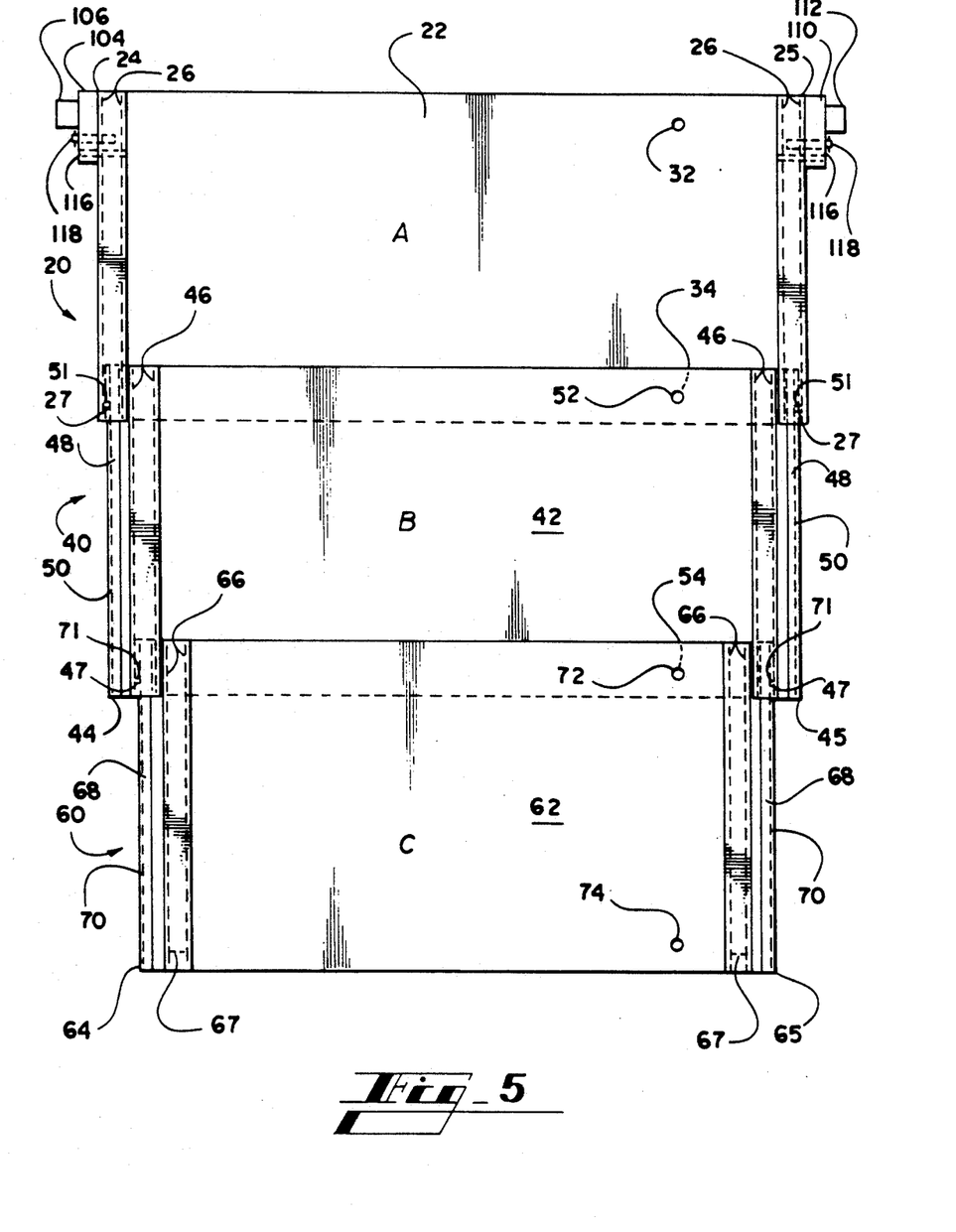
FIG. 5 is a partial plan view of the telescopic tailgate ramp of FIG. 1.

Referring now to FIG. 5, a partial plan view of the ramp 10 illustrates the alignment of several features of the preferred embodiment of the invention, including stopping pins and holes for receiving anti-sliding securement pins 35. FIG. 5 illustrates two trays 40, 60 fully extended from the base tray 20. The last tray 80 in succession is not shown so that some of the features immediately discussed are more apparent. The base tray 20 designated as A has the hole 32 previously discussed which receives the anti-sliding securement pins 35. As previously mentioned, when the trays 20, 40, 60, 80 are fully retracted and stacked over one another the holes 52, 72, 92 in the respective plates 42, 62, 82 of trays 40, 60, 80 are aligned over the hole 32 in the plate 22 of the base tray 20. These holes 32, 52, 72, 92 are located near the bottom edge of each respective tray 20, 40, 60, 80. In addition to the set of holes 32, 52, 72, 92 that become aligned when the ramp 10 is fully retracted, the plate 22 of base tray 20 and each of the plates 42, 62 of the next two succeeding trays 40, 60 have an additional hole 34, 54, 74 near the top edge of each respective tray 20, 40, 60 that is positioned to be aligned with a respective hole 52, 72, 92 along the bottom edge of each succeeding tray 40, 60, 80. In FIG. 5, the trays 40, 60 are fully extended. The plate 22 of the base tray 20 clearly reveals the hole 32 near its bottom edge, however, the hole 34 near its top edge is directly under the hole 52 of plate 42 of the next succeeding tray 40. The bottom edge of each succeeding tray overlaps the top edge of a each preceding tray. The overlap is by an amount sufficient to provide a strong interconnection for supporting loads. In the preferred embodiment, the bottom edge of the tray 40 designated B overlaps the top edge of the base tray 20 designated A. The bottom edge of the tray 60 designated C overlaps the top edge of the tray 40 designated B. Not shown in FIG. 5 is the bottom edge of the tray 80 designated D which overlaps the top edge of the tray 60 C. The top edge of the tray 60 designated C is shown. The hole 52 near the bottom of the tray 40 designated B can be seen, however, the hole 54 near the top edge of the tray 40 designated as B is directly under the hole 72 of the plate 62 of the next succeeding tray 60. The hole 72 near the bottom of the tray 60 designated C can be seen, and because the succeeding tray 80 is not shown the hole 74 near the top edge of the tray 60 designated as C can also be seen. FIG. 5 illustrates the overlap of the trays 20, 40, 60 designated A, B, and C. The next succeeding tray 80 does not need to have a hole near its top edge because the tray 80 is the last in succession and is not overlapped by a succeeding tray. FIG. 5 also illustrates the alignment and interaction of the channels and telescopic end pieces of the ramp 10. The telescopic end pieces 24, 25 of the base tray 20 do not have tenons because there is no preceding tray to connect with. FIG. 5 does illustrate the channels 26 within each telescopic end piece 24, 25. The channels 26 of the telescopic end pieces 24, 25 of the base tray 20 receive the respective elongated tenons 48 of the telescopic end pieces of the tray 40 designated B. To prevent the interconnected tray 40 from being withdrawn from the base tray 20, each channel 26 of the base tray 20 has a stopping pin 27 protruding into the channel 26 from the wall of the channel 26 near the top edge of the tray 20. The elongated tenon 48 of each telescopic end piece 44, 45 of the succeeding tray 40 has a groove 50 within which a stopping pin 51 protrudes from the wall of the groove 50 near the bottom edge of the tray 40. As can be seen, the succeeding tray 40 cannot be removed from the preceding tray 20 because the stopping pins 51 of the succeeding tray 40 cannot travel past the stopping pins of the preceding tray 20. In the same manner as the interaction just described, the channels 46 of the tray 40 designated B receive the elongated tenons 68 of the telescopic end pieces 64, 65 of the succeeding tray 60. The stopping pins 47 protruding into the respective channels 46 of the preceding tray 40 prevent passage of the stopping pins 71 protruding into the respective grooves 70 of the elongated tenons 68 of the telescopic end pieces 64, 65 of the succeeding tray 60. The channels 66 in the respective telescopic end pieces 64, 65 of the tray 60, designated C, receive the elongated tenons of the telescopic end pieces of the succeeding tray 80, which is not shown in this view. The stopping action of the preceding tray 60 with respect to the succeeding tray 80 is achieved as set forth above by the interaction of the stopping pins 67 protruding into the channels 66 and respective stopping pins which protrude into grooves in elongated tenons of the telescopic end pieces of the succeeding tray 80, which is not shown in this view. The support bars 104, 110 upon which the base tray 20 is mounted can be seen in FIG. 6. Protruding from the support bars 104, 110 and through respective telescopic end pieces 24, 25 are anti-pivot pins 118 for preventing the tray 20 from pivoting about the pivot pins 116. The pivot cylinders 106, 112 which enable the ramp 10 to pivot with respect to the tailgate frame 12 of the truck 11 also can be seen in this view.

Figures 6, 9:
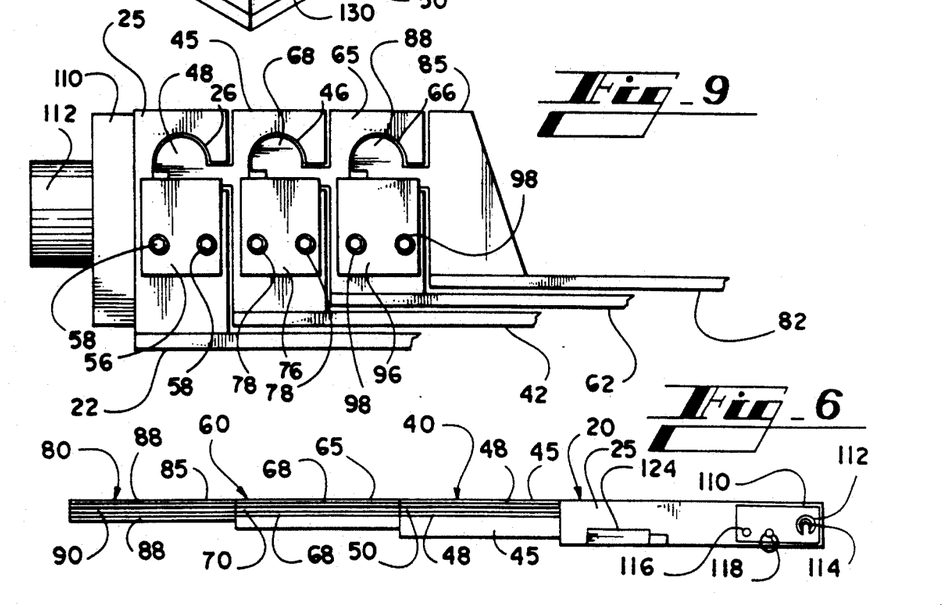
FIG. 6 is a side view of the invention of FIG. 1 illustrating the alignment of the extended ramp trays.
FIG. 9 is a partial rear view of the invention of FIG. 1, illustrating the ramp trays in the retracted stacked alignment of FIG. 2.

Referring now to FIG. 6, there is illustrated a side view of the telescopic tailgate ramp 10 discussed above, in a fully extended position. In this view, there can be seen the alignment of the succession of trays 20, 40, 60, 80 and their respective telescopic end pieces 25, 45, 65, 85, elongated tenons 48, 68, 88 and grooves 50, 70, 90 in the elongated tenons 48, 68, 88. The support bar 110 upon which the base tray 20 is mounted on one side can also be seen in FIG. 6. As previously stated, the anti-pivot pin 118 shown prevents the tray 20 from pivoting about the pivot pin 116 until desired. The pivot cylinder 112 that attaches to the support bar 110 and the bushing 114 for the pivot cylinder 112 are also shown.

Referring now to FIG. 7, therein is illustrated a front view of an alternative embodiment of a telescopic end piece 45'. Using the end piece 45 of FIG. 4 as typical, the telescopic end piece 45' shown in this embodiment also has a channel 46, an elongated tenon 48 and a groove 50 in the elongated tenon 48. However, the bottom edges 49 of this telescopic end piece are chamfered. Chamfering enables the telescopic end pieces to be welded to the plates 22, 42, 62, 82 using filet welds while allowing clearance for the engagement and sliding of preceding or succeeding trays. Clearance is essential because of the close fit between trays as seen in the preceding illustrations. If the telescopic end pieces and plates are to be joined by welding, filet welding is desirable because it is a stronger welding bond that does not leave accumulated welding solder in the corners formed by the junction of welded parts.

Referring now to FIG. 8, the retracted ramp 10 as illustrated in FIG. 2, is now shown in a fully raised position with respect to the tailgate frame 12. When the retracted ramp 10 is fully raised it serves as the tailgate for the truck 11. The lock housings 124 fit over and engage the brackets 13 mounted on the tailgate frame 12. Reinforcement angles 23 are attached on the back surface of the base tray 20. The reinforcement angles 23 deter bowing and deformation of the plate 22 of the base tray 20. Reinforcement of the base tray 20 will deter bowing and deformation of the planes of the remaining trays 40, 60, 80 because the trays 20, 40, 60, 80 overlap and are interconnected. Although the width of the widest plate and tray, that is, the base tray 20 and its plate 22, could be made equal to the width of the tailgate which the ramp 10 has replaced, in the preferred embodiment the width of the base tray 20 is less than the width of the tailgate frame and the tailgate that the ramp 10 has replaced. The resulting space between the tailgate frame 12 and each telescopic end pieces 24, 25 of the base tray is equal to the width of the support bar 104, 110 and the pivot cylinder 106, 112 on each side of the tray 20. As the truck 11 moves, air flows through the spacing, as indicated in FIG. 8, at the sides of the tray 20 decreasing the resistance to air that would normally be encountered when the truck 11 is driven with a tailgate that fits flush with the tailgate frame 12.

Referring now to FIG. 9, therein is illustrated a rear view of one side of the ramp 10. The rear view is from the bottom edge of the ramp 10, or stated in another manner, the edge of the ramp closest to the truck 11. This view reveals the structure used to help prevent each tray 40, 60, 80 from sliding past a preceding tray. The structure used is the attachment of a retaining plate 56, 76, 96 to the end of a preceding respective telescopic end piece 25, 45, 65 to respectively engage the end of the elongated tenon 48, 68, 88 of a telescopic end piece 45, 65, 86 of a succeeding tray 40, 60, 80. Each retaining plate 56, 76, 96 covers part of the opening to the channel 26, 46, 66 thus prevent passage of the tenon 48, 68, 88 inserted in the channel 26, 46, 66. More specifically, referring particularly to FIG. 9, retaining plate 56 is attached to telescopic end piece 25 to engage tenon 48 of telescopic end piece 45. Retaining plate 76 is attached to telescopic end piece 45 to engage tenon 68 of telescopic end piece 65. Retaining plate 96 is attached to telescopic end piece 65 to engage tenon 88 of telescopic end piece 85. The use of retaining plates 56, 76, 96 shown is typical and the same arrangement is used on the opposite side of the ramp 10. The retaining plates 56, 76, 96 are mounted by any suitable means that maintains the clearance tolerances required for proper operation. In the preferred embodiment, the retaining plates 56, 76, 96 are mounted by respective sets of screws 58, 78, 98. The retaining plates 56, 76, 96 prevent the shorter trays from sliding past the wider trays when the ramp 10 is being retracted, and thus greatly facilitates retraction. The retaining plates 56, 76, 96 are also essential in keeping the stack of fully retracted trays 20, 40, 60, 80 aligned when the ramp 10 is in the raised-tailgate position as shown in FIG. 8. The retaining plates 56, 76, 96 also help ensure alignment of the holes 32, 52, 72, 92 of the respective trays 20, 40, 60, 80 over one another so that an anti-sliding securement pin 35 may be inserted. Although the preferred embodiment illustrated utilizes plates to prevent movement, any shape of hardware which can be affixed over a channel is suitable. For example, a metal bar or strip.

Figure 10:
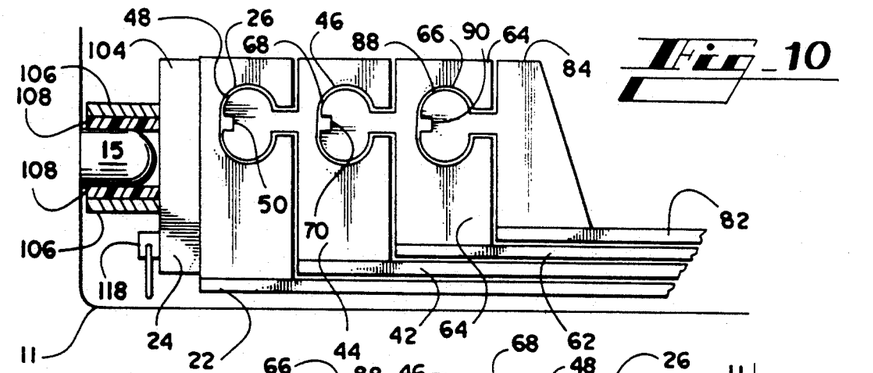
FIG. 10 is a partial front view of the invention of FIG. 1 in the position shown in FIG. 2, illustrating the alignment of the telescopic ramp trays of one side of the invention and a partial sectional view of the pivot piece on that side.
Figures 11, 12, 13:
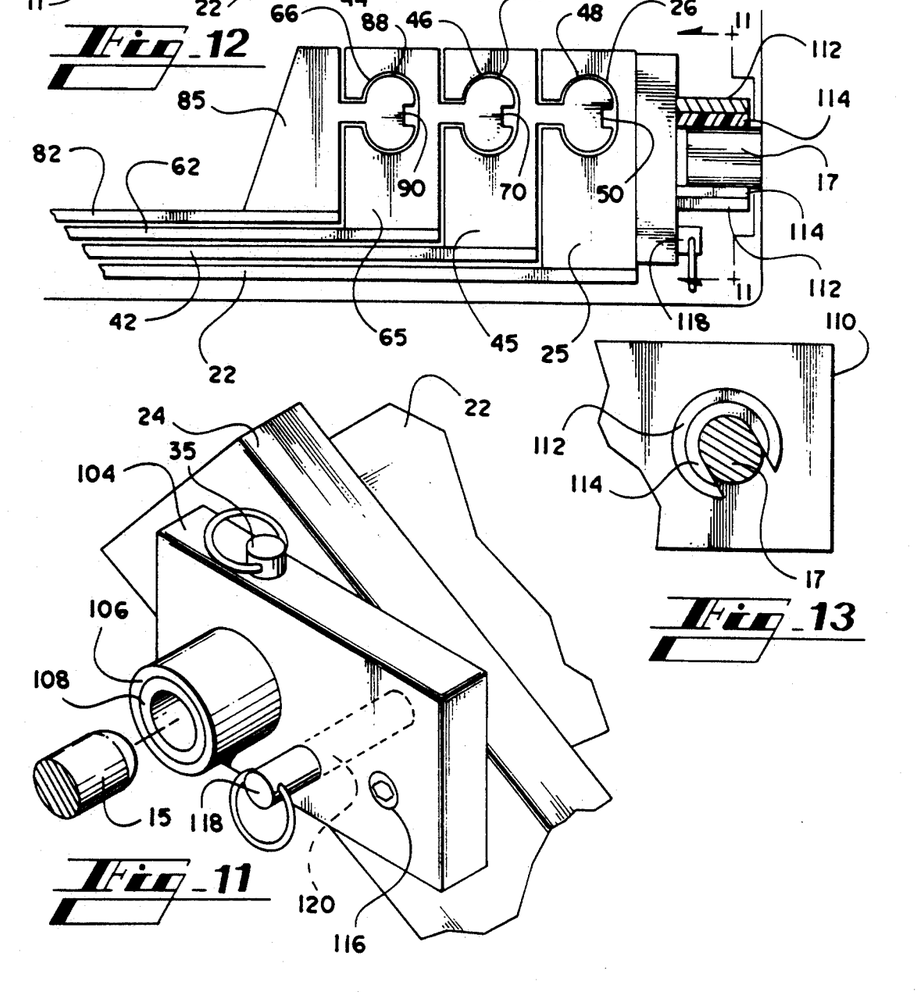
FIG. 11 is an isometric illustration of the pivot mechanisms shown in FIG. 10 according to the invention of FIG. 1.
FIG. 12 is a partial front view of the invention of FIG. 1 in the position shown in FIG. 2, illustrating the alignment of the telescopic ramp trays of the side of the invention opposite the side shown in FIG. 10 and a partial sectional view of the pivot piece on that side.
FIG. 13 is a side view of the pivot mechanism illustrated in FIG. 12.

Referring now to FIG. 10, therein is illustrated a front view of one side of the ramp 10. The feature primarily shown in this view is the pivot mechanism for the side of the ramp 10 shown. In the preferred embodiment illustrated, the ramp 10 uses hollow cylinders 106, 112 on either side of the ramp to engage solid shapes projecting from the tailgate frame. The side of the ramp 10 shown is pivotable with respect to the tailgate frame 12 about the tailgate pivot knob 15. The tailgate pivot knob 15 is attached to the tailgate frame 12 and is standard tailgate mounting hardware for the truck 11. In the illustration of FIG. 10, the tailgate pivot cylinder 106 and bushing 108 within the cylinder have been partially cut away to reveal the engagement of the pivot cylinder 106 and bushing 108 with the knob 15. Referring now also to FIG. 11, an isometric illustration of the portion of the ramp 10 discussed immediately above further illustrates the features described. The pivot cylinder 106 and cylindrical bushing 108 are adapted to fit over the end of pivot knob 15. The standard pivot knob 15 shown is cylindrical and has a dome-like head to facilitate insertion of the pivot knob 15 into the cylinder 106 and bushing 108. This view also portrays the ramp 10, and in particular telescopic end piece 24, pivoted with respect to the support bar 104. The pivot point is pivot pin 116. To allow pivoting, the anti-pivot pin 118 has been partially withdrawn through its shaft 120 in the support bar 104 to remove the anti-pivot pin 118 from the telescopic end piece 24. Also illustrated is an anti-sliding securement pin 35 stored in the support bar 104.

Referring now to FIG. 12, therein is illustrated a front view of the other side of the ramp 10 which is opposite the side shown in FIG. 10. This side of the ramp 10 is pivotable with respect to the tailgate frame 12 about an oblong tailgate pivot knob 17. The tailgate pivot cylinder 112 and bushing 114 within the cylinder have been partially cut away to reveal the engagement of the pivot cylinder 112 and bushing 114 with the oblong knob 17. Referring now also to FIG. 13, therein is illustrated a side view of the portion of the ramp 10 revealing the mounting features of the support bar 110 the pivot cylinder 112 and the bushing 114 adapted for mounting upon the oblong knob 17 of the truck 11. The oblong pivot knob 17 is a standard feature on trucks which allows a tailgate to be removed by lifting the tailgate hardware which engages the oblong knob 17 from the oblong knob 17. Unlike the pivot cylinder 106 which receives the dome-like pivot knob 15 on the other side of the tailgate frame 12, the pivot cylinder 112 which receives the oblong pivot knob 17 has an opening through which the oblong knob 17 is slipped into the pivot cylinder 112. In mounting or dismounting the ramp 10, the ramp 10 is manipulated to first fit the pivot cylinder 106 and bushing 108 over the pivot knob 15 and subsequently lifted to fit the pivot cylinder 112 and bushing 114 onto the oblong pivot knob 17 through the openings in the pivot cylinder 112 and bushing 114. Once the ramp 10 is mounted, the pivot cylinder 112 is pivotable with respect to the bushing 114 which is impaled upon the oblong knob 117. The pivot knob 15 and oblong pivot knob 17 may be installed in tailgate frames of vehicles where necessary to mount the ramp 10. In addition any other standard mounting hardware which receives pivot cylinders of the general nature described above may be used. For example, rather than having a knob 15 or a knob-like protrusion for mounting a tailgate, some vehicles have a tubular protrusion which is essentially a hollow cylindrical piece. Instead of a hollow pivot cylinder 106 that encases a cylindrical piece affixed to the tailgate frame, a solid cylinder could be used and would be insertable into the hollow cylindrical piece to form the pivot joint.

Referring now to FIG. 14, therein is illustrated a locking mechanism for the ramp 10. Although any suitable locking mechanism may be used, the preferred embodiment uses standard lock hardware already mounted upon a truck 11 or similar vehicle. The brackets 13 illustrated in FIG. 14, and also illustrated in FIGS. 1 and 2 are standard tailgate locking hardware on many pickup trucks and similar vehicles. The lock housing 124 encases a lock cylinder 126 and cam lock 128. An opening 125 at the rear of the lock housing 124 allows the bracket 13 to enter the lock housing 124 when the ramp 10 is pivoted into a closed position as previously illustrated in FIG. 8. Referring now again to FIG. 14, the locking mechanism is engaged by rotating the lock cam 128 through the slot in the bracket 13. The cam locking mechanism is also suitable for engaging a pin or rod which some vehicles use as a part of locking hardware.

Although each plate 22, 42, 62, 82 of the ramp trays 20, 40, 60, 80 could have a different height from top edge to bottom edge, the height of each plate 22, 42, 62, 82 is the same in the preferred embodiment. Having plates 22, 42, 62, 82 of equal heights creates a retracted ramp 10, as shown in FIGS. 2 and 8, which occupies no more area than the tailgate which it replaces but provides trays 20, 40, 60, 80 of a maximum top to bottom edge measurement. In turn, trays 20, 40, 60, 80 of a maximum height provide for the greatest possible extension of the ramp 10 because the distance which the ramp 10 may be extended depends upon the top to bottom edge dimension of the trays 20, 40, 60, 80.

The telescopic end pieces 24, 25, 44, 45, 64, 64, 84, 85 may be of varying depths of thickness. However, when the telescopic end pieces 24, 25, 44, 45, 64, 64, 84, 85 are of successively lesser thicknesses of depth and their top surfaces are flush, lying in a single plane as shown in FIGS. 1, 2, 3, 6, 8, 9, 10 and 12 for the preferred embodiment, a more aesthetically pleasing ramp 10 is created. In addition, since the ramp 10 replaces a standard tailgate whose surface which faces the vehicle is normally level, by taking on that same general appearance, the retracted ramp 10 of the preferred embodiment may be pivoted to a closed position within the tailgate frame 12 without interference between the tailgate frame 12 and the telescopic end pieces 24, 25, 44, 45, 64, 64, 84, 85.

The ramp 10 may be adapted for use on almost any vehicle which has a tailgate frame or suitable area for mounting. The exact dimensions of the elements of the ramp 10 will depend upon the dimensions of the mounting area. The dimensions of the ramp 10 are designed to ensure maximum strength while maintaining the clearances necessary for proper manipulation and operation. The ramp trays 20, 40, 60, 80 have an essentially rectangular configuration because most vehicles have a tailgate area which is essentially rectangular. However, the ramp 10 could have a square configuration if required to fit the tailgate area of the vehicle to which it is mounted. Likewise, although the preferred embodiment of the ramp 10 is illustrated in a rectangular configuration mounted upon a tailgate frame at the shorter sides of the rectangle, there may be instances or vehicles wherein a ramp according to the invention may be mounted at the longer sides.

The invention provides a portable ramp and bed extension for a vehicle which is stored and transported as the tailgate of a vehicle. Although the ramp 10 may be used in other ways, in the preferred embodiment the ramp serves as a substitute tailgate. As a substitute tailgate, the ramp 10 does not diminish the storage space available. The ramp 10 may be used with any vehicle which has a tailgate. The ramp 10 works particularly well with tailgated vehicles such as pickup trucks, as illustrated in the preferred embodiment. One reason that the ramp works well with pickup trucks is because the mechanisms of pickup trucks which accommodate tailgates, namely, tailgate frames, pivot mounts and lock catches are often similar from one vehicle, thus enabling a basic model of the telescopic tailgate ramp 10 to fit a variety of vehicles.

The telescopic tailgate ramp 10 may be mounted upon a vehicle by simply removing the existing standard tailgate and installing the telescopic tailgate ramp 10 in its place. A typical tailgate frame is illustrated in FIGS. 1, 2 and 3. FIGS. 10, 11, 12 and 13 illustrate typical hardware found on a vehicle for mounting a tailgate. In FIGS. 10 and 11, a cylindrical knob 15 is the hardware that serves as one side of the pivotable mounting for a tailgate. In FIGS. 12 and 13, the oblong knob 17 serves as the mounting hardware for the other side of a tailgate. To remove a tailgate, the side of a tailgate which is mounted upon the oblong knob 17 is lifted and removed from the oblong knob 17 and then the side which is mounted upon the cylindrical knob 15 is slipped off of the cylindrical knob 15. The procedure is reversed to install the preferred embodiment of a telescopic tailgate ramp 10. In general, the ramp 10 is designed to accommodate the hardware of a standard tailgate frame 10 in essentially the same manner as the tailgate which it replaces.

Once installed, the ramp 10, in the retracted position as illustrated in FIGS. 2 and 8, is a substitute for the removed tailgate. The retracted ramp 10 is pivotable between the raised position illustrated in FIG. 8 and the lowered position illustrated in FIG. 2. When in the raised position, the ramp 10 serves to retain cargo in the same manner as the removed tailgate. The ramp 10 may be locked in place by engagement of the locks 126 with the brackets 13 mounted on the truck 11.

When the ramp 10 is lowered, as in FIG. 2, it may then be extended to a desired length by removing the anti-sliding securement pin 35 from the hole 32 in the tray 80 designated D, grasping the handles 100 and pulling the trays 40, 60, 80 to a desired partially or fully-extended position with respect to the base tray 20. In this manner, the ramp serves as an extension of the bed 14 of the truck 11. Full extension of the ramp 10 as a bed 14 extension is shown in FIG. 3. Once the ramp 10 is fully, or partially, extended, anti-sliding securement pins 35 may can be inserted through a hole 52, 72, 92 of one of the extended trays 40, 60, 80 into a hole near the top edge of a preceding tray to prevent that tray 40, 60, 80 from accidentally sliding back towards the base tray 20.

The telescopic tailgate ramp 10 is suspended from the tailgate frame of the truck 11 when the ramp 10 is used as a tailgate or an extended bed, as illustrated in FIGS. 2 and 3, respectively. The cables 122 or other hardware which suspend the ramp 10 are disconnected from either the tailgate frame 12 or the ramp 10 to use the ramp 10 in a ramp mode. To use the ramp 10 as a ramp, once the cables 122 are removed the ramp is grasped by the handles 100, extended or retracted to a desired length, and placed upon a loading dock, the ground of other surface from which it is desirable to load cargo onto the truck 11. FIG. 1 illustrates the ramp 10 lowered to the ground or other surface which is lower than the bed 14 of the truck. When it is necessary to lower the ramp 10 to a level wherein the bumper 19 of the truck 11 is encountered, the base tray 20 is pivoted with respect to the support bars 104, 110 to allow the base tray 20 to pivot about an axis farther away from the end of the truck 11 and the tailgate frame 12. The base tray 20 is made pivotable with respect to the support bars 106, 110 by removing the anti-pivot pins 118 from each support bar 106, 110, thus allowing the base tray 20 to pivot about the pivot pins 116. When use of the ramp 10 is completed, the handles 100 are grasped, the ramp is returned to a fully-retracted position and placed in either the lowered tailgate mode illustrated in FIG. 2 or an extended bed mode as illustrated in FIG. 3 or the raised tailgate mode of FIG. 8.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A telescopic tailgate ramp for a vehicle having a tailgate frame comprising:

a base tray and first, second, and third successively shorter lengthwise ramp trays stacked in slidable interlocking relationship to one another, said base tray having a first essentially rectangular plate and a first elongated telescopic member affixed to each narrow end thereof, said first elongated telescopic member defining a first elongated channel having a lower end and an upper end, said first elongated channel having a stopping member affixed proximate said upper end of said first elongated channel, said first successively shorter lengthwise ramp tray having a second essentially rectangular plate slightly shorter lengthwise than said first rectangular plate and a second elongated telescopic member affixed to each narrow end thereof, each said second elongated telescopic member having a first elongated tenon corresponding to and to be received by said first elongated channel of said first elongated telescopic member, said first elongated tenon defining a first elongated groove having an upper end and a lower end with a stopping member affixed proximate said lower end of said first elongated groove, each said second elongated telescopic member defining a second elongated channel having an upper end and a lower end and a having a stopping member affixed proximate said upper end of said second elongated channel, said second successively shorter lengthwise ramp tray having a third essentially rectangular plate slightly shorter lengthwise than said second rectangular plate and a third elongated telescopic member affixed to each narrow end thereof, each said third elongated telescopic member having a second elongated tenon corresponding to and to be received by said second elongated channel of said second elongated telescopic member, said second elongated tenon defining a second elongated groove having an upper end and a lower end and having a stopping member affixed proximate said lower end of said second elongated groove, each said third elongated telescopic member defining a third elongated channel having an upper end and a lower end and having a stopping member affixed proximate said upper end of said second elongated channel, said third successively shorter lengthwise ramp tray having a fourth essentially rectangular plate slightly shorter lengthwise than said third rectangular plate and a fourth elongated telescopic member affixed to each narrow end thereof, each said fourth elongated telescopic member having a third elongated tenon corresponding to and to be received by said third elongated channel of said third elongated telescopic member, said third elongated tenon defining a third elongated groove having an upper end and a lower end and having a stopping member affixed proximate said lower end of said third elongated groove;

a first retaining plate affixed to a bottom end of each respective said first elongated telescopic member at least partially extending over an opening to said first channel defined by said first elongated telescopic member;

a second retaining plate affixed to a bottom end of each respective said second elongated telescopic member at least partially extending over an opening to said second channel defined by said second elongated telescopic member;

a third retaining plate affixed to a bottom end of each respective said third elongated telescopic member at least partially extending over an opening to said third channel defined by said third elongated telescopic member;

a support member pivotally attached proximate a bottom end of each said first elongated telescopic member;

an anti-pivot member insertable through a bore defined in each respective said support member and a bore defined in each corresponding said first elongated telescopic member, said bore defined in each respective said support member and said bore defined in each corresponding said first elongated telescopic member being parallel to a first axis of pivot about which said respective support member is pivotable with respect to a corresponding said first telescopic member;

means for pivotally connecting said support members to the tailgate frame of the vehicle such that bottoms ends of said first elongated telescopic members are pivotable with respect to the tailgate frame about a second axis of pivot, said second axis of pivot being closer to the tailgate frame of the truck than said first axis of pivot;

at least one handle affixed to said fourth essentially rectangular plate.

2. The invention of claim 1, each of said second, third and fourth elongated telescopic member having a depth less than a preceding said elongated telescopic member and having a top surface level with a top surface of said first elongated members.

3. The invention of claim 1, each said essentially rectangular plate having traction enhancing protrusions on an upper surface thereof.

4. The invention of claim 1, further comprising at least one anti-sliding member, each said first, second, third, and fourth essentially rectangular plate defining a first aperture for receiving said anti-sliding member, said first aperture positioned in each plate such that said first aperture in each plate is vertically aligned with respect to one another when said base tray, said first successively shorter lengthwise ramp tray, said second successively shorter lengthwise ramp tray and said third successively shorter lengthwise ramp tray are in vertical alignment with one another.

5. The invention of claim 1, each said first, second and third essentially rectangular plate defining a second aperture for receiving said anti-sliding member, said second aperture positioned in each said first, second and third essentially rectangular plate such that said first aperture of said second, third and fourth essentially rectangular plates is respectively positioned over said second aperture of said first, second and third essentially rectangular plates when said first, second and third successively shorter lengthwise ramp trays are fully extended from said base tray.

6. The invention of claim 1, further comprising at least one reinforcing member affixed lengthwise across a bottom surface of said first essentially rectangular plate.

7. The invention of claim 1, further comprising a lock housing affixed to each side of said base tray adapted for receiving a bracket having a slot mounted upon a tailgate frame of the vehicle and also further comprising a cam lock rotatably attached within said lock housing for selectively engaging the slot of said bracket.

8. The invention of claim 1, wherein bottom edges of each said first, second, third and fourth elongated telescopic member are chamfered and said first, second, third and fourth elongated telescopic members are affixed to said respective base tray, and said first, second and third successively shorter lengthwise ramp trays by means of a filet weld.

9. The invention of claim 1, further comprising a friction-reducing substance interposed between said first elongated channels and said first elongated tenons, said second elongated channels and said second elongated tenons, and said third elongated channels and said third elongated tenons.

10. The invention of claim 9, said friction reducing substance interposed between said first elongated channels and said first elongated tenons, said second elongated channels and said second elongated tenons, and said third elongated channels and said third elongated tenons comprising strips of friction-reducing plastic applied to said first elongated tenons, said second elongated tenons and said third elongated tenons.

11. The invention of claim 1, wherein the tailgate frame has a cylindrical knob for mounting a tailgate affixed within one side of the tailgate frame and an oblong knob for mounting a tailgate affixed within another side of the tailgate frame, and wherein said means for pivotally connecting said support members to the tailgate frame comprises a first hollow cylindrical member for receiving the cylindrical knob and a second hollow cylindrical member defining a first slot for receiving the oblong knob, and further comprising a hollow cylindrical bushing insertable within said first hollow cylindrical member and a solid cylindrical bushing insertable within said second hollow cylindrical member, said solid cylindrical bushing defining a second slot corresponding to said first slot defined by said second hollow cylindrical members for receiving the oblong knob.

12. The invention of claim 1, further comprising means for suspending said base tray from the tailgate frame of the vehicle.

13. The invention of claim 1, further comprising means for attaching said base tray to the tailgate frame for suspending said base tray and said first, second, and third successively shorter lengthwise ramp trays essentially parallel to a bed of the vehicle.

14. A telescopic tailgate ramp for a vehicle having a tailgate comprising:
a base tray and at least one stacked, successively shorter lengthwise ramp tray,
said base tray having a first plate and a first pair of telescopic members attached thereto,
said at least one stacked, successively shorter lengthwise ramp tray having a corresponding plate shorter lengthwise than said first plate of said base tray and shorter lengthwise than a preceding said at least one stacked, successively shorter lengthwise ramp tray, and a successive pair of telescopic members attached thereto,
each of said first pair of telescopic members defining a channel,
each of said pair of telescopic members of said at least one stacked, successively shorter lengthwise ramp trays having a tenon member,
wherein said channels of said first pair of telescopic members of said base tray correspond to and receive said tenon members of a first said at least one stacked, successively shorter lengthwise telescopic ramp tray,
wherein each of said successive pair of telescopic members of said at least one stacked, successively shorter lengthwise ramp tray defines a channel for receiving said tenon member of said at least one stacked, successively shorter lengthwise ramp tray which succeeds a first said at least one stacked, successively shorter lengthwise telescopic ramp tray,
wherein each said tenon member defines a groove along a length thereof,
each said channel having a stopping member protruding thereinto proximate a front end thereof,
each said groove defined by a tenon member having a stopping member protruding thereinto proximate a rear end thereof,
whereby said stopping member protruding into said channel which receives and interconnects with said tenon member engages said stopping member protruding into said groove defined by said tenon member which is received by said channel;
means for preventing said at least one stacked, successively shorter lengthwise ramp tray from translating past a bottom edge of said base tray; and
means for pivotally mounting said base tray upon the vehicle such that said base tray is pivotable about a first axis with respect to the tailgate frame of the vehicle.

15. The invention of claim 14, wherein the tailgate frame has a knob affixed within each side of the tailgate frame for receiving a tailgate and wherein said means for pivotally mounting said base tray upon the vehicle comprises a hollow cylindrical member affixed to each side of said base tray for receiving each knob.

16. The invention of claim 15, further comprising a support member interposed between said hollow cylindrical member and said base tray, pivotally attached to each end of said base tray such that said base tray is pivotable with respect to said support member about a second axis of pivot farther away from the vehicle than said first axis such that a bumper of the vehicle does not fully prohibit downward pivoting of the base tray.

17. The invention of claim 14, wherein the tailgate frame has a cylindrical knob for mounting a tailgate affixed within one side of the tailgate frame and an oblong knob for mounting a tailgate affixed within another side of the tailgate frame, and wherein said means for pivotally mounting said base tray upon the vehicle comprises attached to said base tray a first hollow cylindrical member for receiving the cylindrical knob and a second hollow cylindrical member defining a first slot for receiving the oblong knob, and further comprising a hollow cylindrical bushing insertable within said first hollow cylindrical member and a solid cylindrical bushing insertable within said second hollow cylindrical member, said solid cylindrical bushing defining a second slot corresponding to said first slot defined by said second hollow cylindrical member for receiving the oblong knob.

18. A telescopic tailgate ramp for a vehicle having a tailgate frame comprising:
- a base tray and at least one stacked, successively shorter lengthwise ramp tray having means for slidably connecting said base tray and said at least one stacked, successively shorter lengthwise ramp tray;
- means for preventing said at least one stacked, successively shorter lengthwise ramp tray from being fully withdrawn from one another and from said base tray;
- means for preventing said at least one stacked, successively shorter lengthwise ramp tray from translating past a bottom edge of said base tray;
- a knob affixed within each side of the tailgate frame; and
- a hollow cylindrical member affixed to each side of said base tray for receiving each knob,
- each said knob and each said hollow cylindrical member pivotally mounting said base tray about a first axis.

19. The invention of claim 18, further comprising a support member interposed between said hollow cylindrical member and said base tray, pivotally attached to each end of said base tray such that said base tray is pivotable with respect to said support member about a second axis of pivot farther away from the vehicle than said first axis such that a bumper of the vehicle does not fully prohibit downward pivoting of the base tray.

20. A telescopic tailgate ramp for a vehicle having a tailgate frame having a cylindrical knob for mounting a tailgate affixed within one side of the tailgate frame and an oblong knob for mounting a tailgate affixed within another side of the tailgate frame comprising:
- a base tray and at least one stacked, successively shorter lengthwise ramp tray having means for slidably connecting said base tray and said at least one stacked, successively shorter lengthwise ramp tray;
- a first hollow cylindrical member attached to one side of said base tray for receiving the cylindrical knob of the tailgate frame;
- a second hollow cylindrical member attached to another side of said base tray defining a first slot for receiving the oblong knob of the tailgate frame;
- a hollow cylindrical bushing insertable within said first hollow cylindrical member;
- a solid cylindrical bushing insertable within said second hollow cylindrical member, said solid cylindrical bushing defining a second slot corresponding to said first slot defined by said second hollow cylindrical member for receiving the oblong knob;
- means for preventing said at least one stacked, successively shorter lengthwise ramp tray from being fully withdrawn from one another and from said base tray; and
- means for preventing said at least one stacked, successively shorter lengthwise ramp tray from translating past a bottom edge of said base tray.

* * * * *